United States Patent
Achkir et al.

(10) Patent No.: US 10,419,323 B2
(45) Date of Patent: Sep. 17, 2019

(54) MODULATION ANALYZER MODULE

(71) Applicant: CISCO TECHNOLOGY, INC., San Jose, CA (US)

(72) Inventors: D. Brice Achkir, Livermoore, CA (US); Andy Yu, Castro Valley, CA (US); Natalia Bondarenko, San Jose, CA (US); John Michael Wincn, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 126 days.

(21) Appl. No.: 15/495,820

(22) Filed: Apr. 24, 2017

(65) Prior Publication Data
US 2018/0309654 A1   Oct. 25, 2018

(51) Int. Cl.
H04L 12/16 (2006.01)
H04L 12/26 (2006.01)
G06F 11/34 (2006.01)

(52) U.S. Cl.
CPC ......... H04L 43/50 (2013.01); G06F 11/3452 (2013.01); H04L 43/022 (2013.01)

(58) Field of Classification Search
None
See application file for complete search history.

(56) References Cited

U.S. PATENT DOCUMENTS

| | | | |
|---|---|---|---|
| 5,317,693 A * | 5/1994 | Cuenod | G06F 9/4411 370/257 |
| 7,787,386 B1 | 8/2010 | Marshall et al. | |
| 8,036,539 B2 | 10/2011 | Kiely et al. | |
| 2006/0291857 A1* | 12/2006 | Mackenzie | H04B 10/0779 398/9 |
| 2008/0001798 A1* | 1/2008 | Moll | G01R 31/316 341/120 |
| 2009/0162057 A1* | 6/2009 | Friedrich | H04Q 11/0005 398/43 |
| 2011/0182191 A1* | 7/2011 | Jackson | H04L 43/10 370/250 |
| 2012/0001786 A1* | 1/2012 | Hisch | H03M 1/188 341/155 |
| 2012/0102239 A1* | 4/2012 | Huang | H04L 12/40169 710/14 |
| 2012/0173935 A1* | 7/2012 | Skirmont | H04B 10/40 714/704 |
| 2013/0162279 A1* | 6/2013 | Achkir | H04L 1/241 324/756.02 |
| 2014/0318268 A1* | 10/2014 | Sorensen | G01F 1/662 73/861.27 |
| 2016/0248498 A1* | 8/2016 | Mottahedin | H04B 10/40 |
| 2018/0091251 A1* | 3/2018 | Hanneman, Jr. | G02B 6/293 |
| 2018/0227049 A1* | 8/2018 | Sahni | H04B 10/40 |

* cited by examiner

Primary Examiner — Bunjob Jaroenchonwanit
(74) Attorney, Agent, or Firm — Cindy Kaplan

(57) ABSTRACT

In one embodiment, an apparatus includes a connector for directly connecting the apparatus to a host when the apparatus is received at a host interface configured for receiving a pluggable transceiver, a sampler module configured for under-sampling a periodic waveform transmitted from the host, and an interface for transmitting sampled data to a processing device operable to process and analyze the sampled data for use in determining if the host is operating within specified limits.

20 Claims, 6 Drawing Sheets

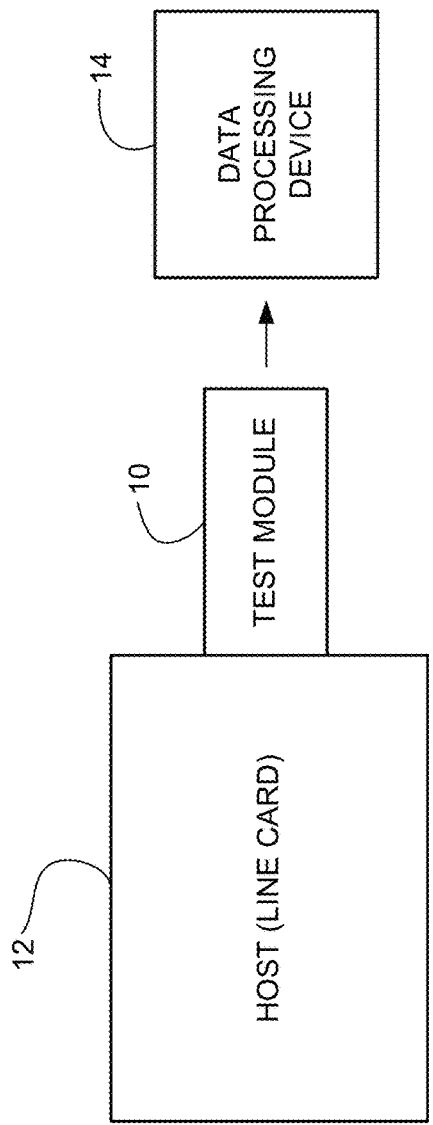
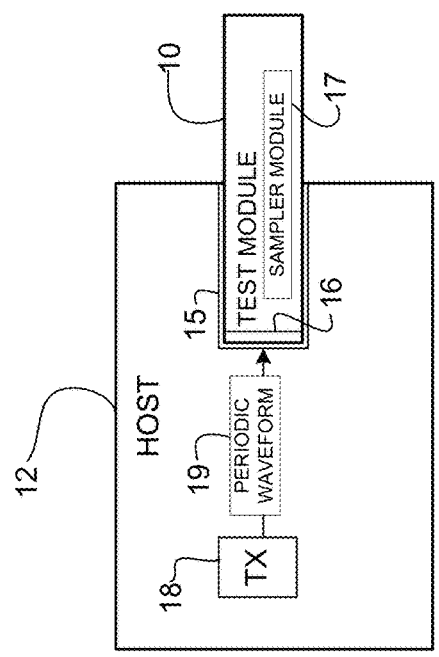

MODULATION ANALYZER MODULE

TECHNICAL FIELD

The present disclosure relates generally to test equipment for electronic components, and more specifically a modulation analyzer for a host system.

BACKGROUND

To satisfy the increasing demand of bandwidth and speed, pluggable transceiver modules are used in line cards on various network devices (e.g., switches, routers, etc.). The pluggable transceiver modules are used to convert electrical signals to optical signals or in general as the interface to a network element copper wire or optical fiber. There are tests that need to be performed on the interface between the transceiver and a host for compliance with standards and to ensure that the transceiver will work properly with the host. Conventional testing is time intensive and involves high costs, and may not be scalable in a manufacturing and production environment.

BRIEF DESCRIPTION OF THE DRAWINGS

FIG. 1A is a block diagram illustrating testing of a host with a test module, in accordance with one embodiment.

FIG. 1B illustrates details of an interface between the host and test module of FIG. 1A, in accordance with one embodiment.

Corresponding reference characters indicate corresponding parts throughout the several views of the drawings.

DESCRIPTION OF EXAMPLE EMBODIMENTS

Overview

Figure 2:
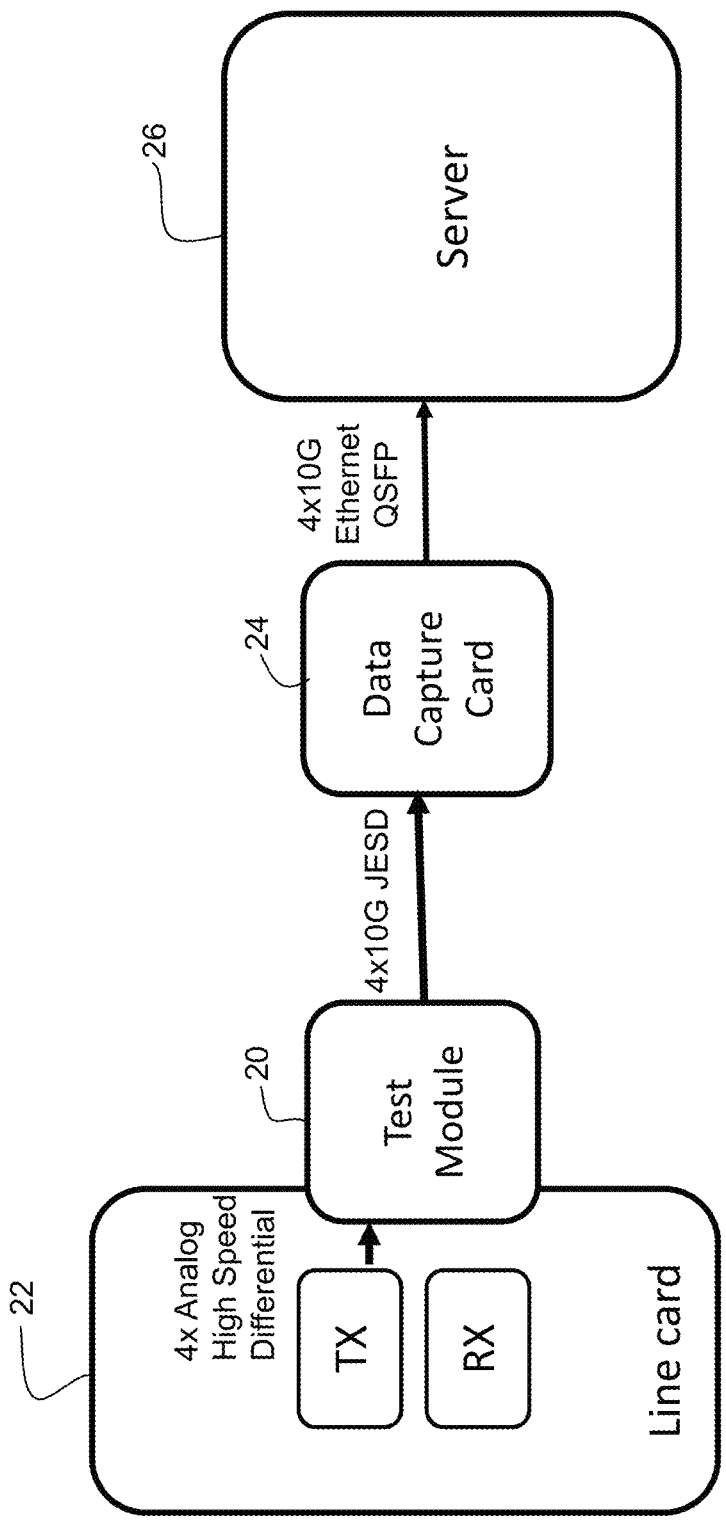
FIG. 2 is a block diagram of the test module in communication with a data capture card, in accordance with one embodiment.

In one embodiment, an apparatus generally comprises a connector for directly connecting the apparatus to a host when the apparatus is received at a host interface configured for receiving a pluggable transceiver, a sampler module configured for under-sampling a periodic waveform transmitted from the host, and an interface for transmitting sampled data to a processing device operable to process and analyze the sampled data for use in determining if the host is operating within specified limits.

In another embodiment, a system generally comprises a test module comprising a connector for directly connecting the test module to a host when the test module is received at a host interface configured for receiving a pluggable transceiver, a sampler module configured for under-sampling a periodic waveform transmitted from the host, and an interface for transmitting sampled data to a processing device, and the processing device operable to process and analyze the sampled data for use in determining electrical behavior of the host.

In yet another embodiment, a method generally comprises receiving a signal transmitted from a host at a test module, at least a portion of the test module inserted into a host interface configured to receive a pluggable transceiver module, under-sampling the signal, reconstructing the signal, and processing the reconstructed signal for extraction of electrical parameter data for analyzing performance of the host.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Pluggable transceiver modules come in many different form factors such SFP (Small Form-Factor Pluggable), QSFP (Quad Small Form-Factor Pluggable), CFP (C Form-Factor Pluggable), and the like, and may support data rates up to 400 Gb/s, for example. Different types of modulations are in use or planned for use, including, for example, NRZ (Non-Return to Zero), PAM4 (Pulse Amplitude Modulation-4) or higher order of modulation (e.g., PAM8), duo-binary, coherent, etc. The pluggable transceiver modules operate as an engine that converts electrical signals to optical signals or in general as the interface to the network element copper wire or optical fiber. Hosts for these pluggable modules include line cards used on switches, routers, edge products, and other network devices.

The transceiver, host, and interface between the transceiver and host generally need to meet requirements set forth in standards such as IEEE (Institute of Electrical and Electronic Engineers) and OIF (Optical Internet Forum) on the network side and MSA (Multi Source Agreement) standards that control the electrical interface between the transceiver module and host. Testing of a host interface and compatibility with the transceiver is often difficult and expensive due to the number of components to be tested as well as conventional equipment, which is typically complex and expensive. In one example, on the network side there are many parametric tests that need to be performed in order to comply with relevant standards. On the interface between the pluggable transceiver module and the host, several parametric tests need to be performed not only for compliance with the MSA, but also for the module to work properly with the host, including calibration of the host transmitter and receiver. These tests are highly dependent on the channel connecting the module to the host driver and receiver. In conventional testing, a rigorous calibration using a complex setup is needed for each port on the host. For example, calibration may first determine s-parameters (scatter parameters) of the channel connecting the transmitter of the host to the module. Once this is determined, two passive modules may be used, with one that is a hard loopback in the module connecting the transmitters to receivers (e.g., Tx1 to Rx1, Tx2 to Rx 2, Tx3 to Rx3, and Tx4 to Rx4) followed by another hard loopback.

The time to perform just the calibration tasks with conventional test equipment may vary from two hours to four hours per port. This is not a scalable process in testing for new products or in a manufacturing or production environment in which the need for expertise to deal with this type of complex setup and equipment are not easy to find, and the calibration station per port cost is high. If additional parametric testing such as BER (Bit Error Rate) and other tests are included, the test time is not acceptable in large production environments in which customer lead time would be drastically impacted.

Moreover, conventional testing equipment such as Data Communication Analyzers (DCA), sampling oscilloscopes, and the like are typically too expensive to be widely used in a high scale manufacturing environment. In addition, the usage of these types of instruments is very complex and calibration is very time intensive. While this may be acceptable in a lab environment and in early prototyping with a small number of units, it is not adequate in a manufacturing environment or at a customer site due to the cost, time, and complexity.

The embodiments described herein provide a module form factor that may be used to analyze any type of modulation format in a high speed architecture environment. The module (referred to herein as a test module) is operable to mimic an actual optical module (pluggable transceiver module) and serve as an analyzer for a host. This eliminates the need to create a new test module for new optical module designs since it can be used in various types of testing, including, for example, DVT (Design Verification Testing), calibration, manufacturing, etc. and provides reduced cost and testing time, thus allowing for additional parallel validation testing to be performed as needed. The system described herein may be used in production or manufacturing, to service a product in the field, or provide tuning and calibration of a product at a customer site, for example.

The embodiments described herein address the drawbacks discussed above by integrating sampling functions, data generation, data detection, plus module functions needed to perform a hand shake with the host in a module form factor that is compliant with appropriate standards. The test module may be scalable to rates exceeding 160 Gb/s per port (or lower rates) and operate with different modulation formats, including, for example, NRZ, PAM4, PAM8, coherent, duo-binary, and others. Furthermore, the test module may implement any number of active channels. As described in detail below, a test system allows for sampling, reconstruction, and post-processing of transmitter waveforms for extraction of electrical scattering parameter data, as extracted from a host system. One or more embodiments may perform testing through reliance on an under-sampling process, but at a reduced cost and thereby provide application for many environments, including manufacturing or customer sites. The embodiments provide a platform that is easily scalable through software to support any modulation schema.

Referring now to the drawings and first to FIG. 1A, a block diagram of a test setup in which a test module 10 may test a host 12 is shown. In one or more embodiments, the test module 10 is a self-contained unit that is directly coupled to the host 12, thus eliminating the need for any cables, connectors, or additional equipment, which may introduce losses or other interference with the test signals or data collected by the test module 10. A known test pattern is input at the host 12 and the host transmits one or more signals directly to the test module 10 at a host edge connector (host interface). As described below, data capture may be integrated with sampling functions at the test module 10 or performed at another device. The test module 10 outputs data to a data processing device 14 configured to receive data from the test module and perform post-processing operations (e.g., reconstruction of an original source signal, removal or compensation for impairments introduced by the sampling and reconstruction process, delivery of common electrical qualities of the sampled system). In one or more embodiments, the test module 10 and data processing device 14 provide sampling, reconstruction, and post-processing of transmitter waveforms received from the host 12 for extraction of electrical scattering parameter data from the host system.

The host 12 may be a line card or other electronic component operable to utilize transceivers and interface with a telecommunications network. The host 12 may include a printed circuit board (PCB) and electronic components and circuits operable to interface telecommunication lines (e.g., copper wire, optical fibers) in a telecommunications network. The host 12 may be configured to perform one or more operations and comprise one or more components (e.g., electrical elements of a high speed digital to analog converter to digitize a received signal, high speed digital signal processor (DSP) to reconstruct transmitted information, etc.) and may be configured to receive any number or type of pluggable transceiver modules (e.g., SFP, QSFP, CFP, etc.) configured for transmitting and receiving signals. The transceiver may be configured to support gigabit Ethernet, Fibre Channel, or other communication standards. In one example, the host 12 may be configured to receive an 8, 12, or other port count ACO (Analog Coherent Optics) transceiver.

The test module 10 may be used to qualify the performance of the host 12 that will deliver high-bandwidth, high-data-rate signaling before the host or a system (e.g., network device) containing the host is shipped to market and used in a customer environment. The host (e.g., line card) 12 may be configured for operation in any type of chassis or network device (e.g., router, switch, gateway, controller, edge device, access device, aggregation device, core node, intermediate node, or other network device). The network device may comprise any number of hosts and operate in the context of a data communication network including multiple network devices. The network device may communicate over one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet, intranet, radio access network, public switched network, or any other network).

The host 12 comprises one or more interfaces for receiving input such as a test pattern (source waveform) and various components positioned on or in relation to the printed circuit board, including a host interface (connector) for enabling the test module 10 to directly communicatively interface with the host, as described further below with respect to FIGS. 1B and 6.

FIG. 1B schematically illustrates a direct connection between the test module 10 and host 12. The host 12 includes a transmitter 18 for transmitting a periodic waveform 19, which is received at the test module 10. As described below, the periodic waveform comprises a predictable repetition rate and has sufficient frequency content for post-processing. The host 12 includes a host interface 15 for slidably receiving the test module 10, which includes a connector 16 (e.g., module plug connector assembly) for direct connection with the host 12 at the host interface.

As described further below, the test module 10 comprises a sampler module 17 operable to sample at a rate that is time-synchronous with the source. In one or more embodiments, the sampler module 15 uses a process known as "under-sampling", whereby the system repetitively samples a high frequency process and re-constructs captured samples for post-processing.

The test module 10 may sample and qualify analog signals having magnitude, phase, and frequency content outside of real-time sampling capability of electrical capture and signal conversion. For example, the test module 10 may provide a high-bandwidth waveform capture and conversion system that relies on under-sampling of complex, high-frequency analog waveforms for post-analysis. In one example, the test module 10 may sample a periodic source waveform of predictable repetition rate so that the under-sampled data can be reconstructed into an output waveform and analyzed. In one or more embodiments, the test module 10 samples at a rate that is time-synchronous with a source and maintains a traceable time reference of the captured signal, as described below with respect to FIG. 4. The test module 10 may be adaptable to timing skew between disparate electrical capture and conversion components. In one or more embodiments, the test module 10 supports complex signal capture and conversion from more than one hosted signal source simultaneously and may implement any number of active channels. For example, the test module 10 may implement four active channels, which may provide 4×160 Gb/s bandwidth. It is to be understood that this is only an example and that a different number of channels or bandwidth may be used.

The test module 10 is configured to deliver specific qualification of electrical waveforms that are generated by the host data communication system. For example, the test system may perform s-parameter extraction, BERT (bit error rate testing), PRBS (pseudo random bit sequence) (word) and customized pattern generation and detection, constellation errors for QAM (Quadrature Amplitude Modulation), jitter decomposition, and error vector modulation measurements, provide eye diagrams with standard eye measurements (e.g., rise time, fall time, amplitude, etc.), and integration of voltage measurement, temperature monitoring, and power load to simulate real optical module power consumption and low speed interface control (e.g., MDIO (Management Data Input/Output), I2C (2-wire interface, etc.), Serial Peripheral Interface (SPI), or any other test or combination thereof.

Referring again to FIG. 1A, the data processing device 14 (e.g., server, computer, or any other post-processing device) may process data received from the test module 10 based on a source waveform with sufficient frequency content for post-processing at the data processing device. The result of the sample process at the test module 10 may be delivered to the data processing device 14 in a computer-compatible, binary format for post-processing in software, for example. Post-processing may include reconstruction of the original signal, automatic removal or compensation for impairments that are introduced by the sampling reconstruction process, delivery of common electrical qualities of the sampled system (e.g., scattering parameters), or other post-processing operations. Post-processing may be performed, for example, at a Personal Computer (PC) or other data processing device, or data may be transmitted to a remote location for post-processing. Any number of port samplers may be constructed in parallel and N-port sampled data may be sent to the remote post-processing device.

As previously noted, data capture may be performed through an under-sampling and reconstruction process. The under-sampled signal is reconstructed post-capture. The source signal is preferably relatively smooth (e.g., relatively free of voltage inflection, transient distortion, and similar effects). Software smoothing algorithms may be applied to the reconstructed waveform to return a close approximation of the original source waveform at an interpolated sampling rate. In one example, a cubic spline interpolation algorithm, or any other suitable algorithm, may be used. Post-processing of captured data through cubic spline interpolation returns higher frequency content than was available in the original sampled waveform. Ordinary FFT (Fast Fourier Transform) routines may then be used to extract target system behavior as a function of frequency.

Figure 3:
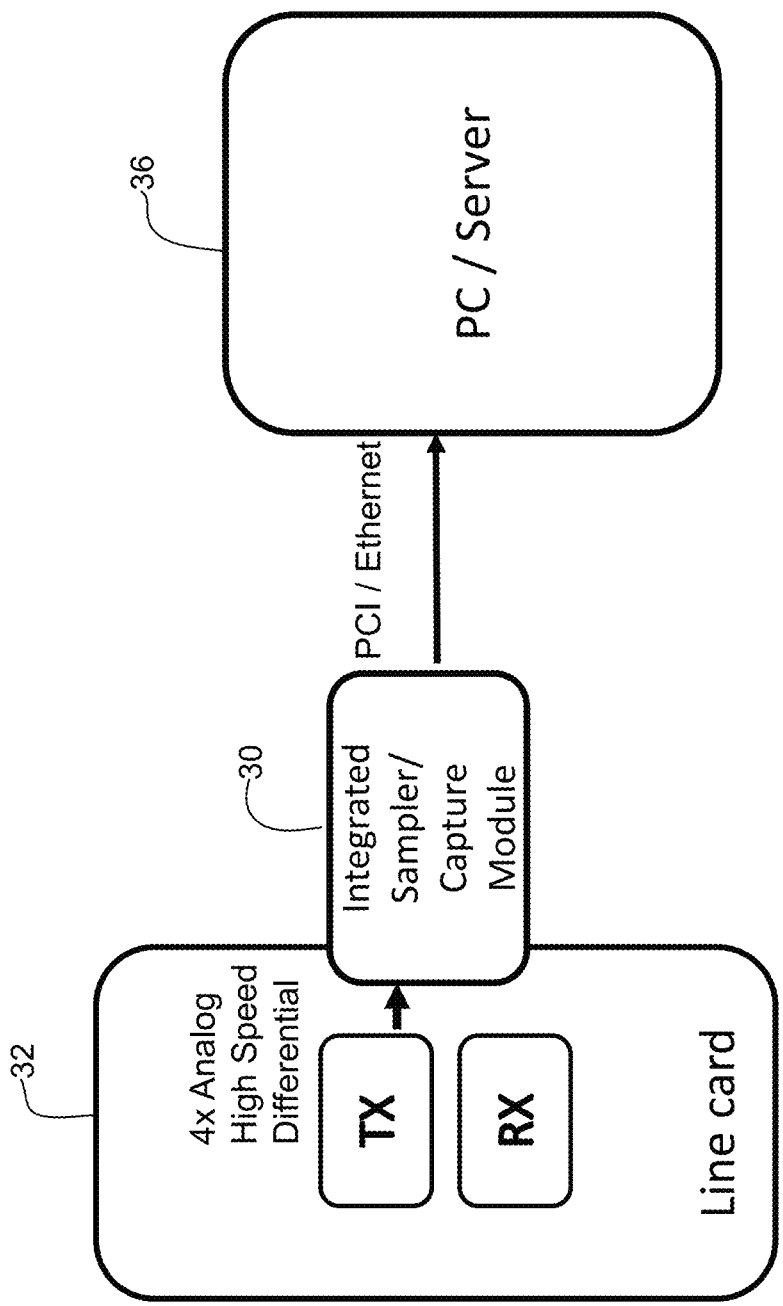
FIG. 3 is a block diagram of the test module with integrated data capture, in accordance with one embodiment.

Processing of sampled data may be transferred to a data capture card (FIG. 2) or may be integrated into the test module 10 (FIG. 3).

FIG. 2 illustrates an embodiment in which the processing of data is performed on a data capture card 24, independent of a test module 20. The line card (host) 22 transmits data from its transceiver (TX) to the test module 20. Test module data (e.g., captured sampled ADC serial data) may be transferred over a serial data interface (e.g., JESD interface) to a data capture card 24 and transported to a server 26 configured to process and present the data. The server 26 may include a GUI (Graphical User Interface) for controlling the test module 20. In one example, data is transferred from the line card 22 to the test module 20 over four analog high speed differential serial data interfaces and transferred to the data capture card on four 10G JESD (e.g., JESD204B) interfaces. In the example shown in FIG. 2, the data capture card 24 transmits the data to the server 26 over a 4×10G Ethernet QSFP (Quad Small Form-Factor Pluggable).

The data capture card 24 may be located near the test module 20 and also be compact (e.g., 4 in. by 4 in. or any other dimension). In one example, the data capture card includes interfaces configured for JESD data input and for receiving a QSFP (or other form factor) module for Ethernet output. The data capture card 24 may further include a USB interface and a power input connector, along with any other electrical components for use in performing the functions described herein. An example of a test module 20 configured to operate with the data capture card 24 is described further below with respect to FIG. 4.

FIG. 3 illustrates an embodiment in which the processing of data is performed utilizing an FPGA (Field Programmable Gate Array) integrated into a test module 30 and controlled through a GUI (Graphical User Interface) and an Ethernet port. Output from the line card (host) 32 is received at the integrated sampler/capture test module 30 and transmitted to a PC/server 36 over a PCI/Ethernet connection. In this example, all of the hardware is self-contained and the GUI can run on any PC that has an Ethernet port to communicate with the test module 30. It may be noted that the size of a PCB of the test module 30 needed to implement all of the hardware may need to be increased, and since the width and the thickness of the module may be limited in order to conform with standard pluggable module formats, the only dimension available is the length. Thus, in some cases this implementation may result in a test module 30 that may interfere with certain thermal chamber doors.

Figure 4:
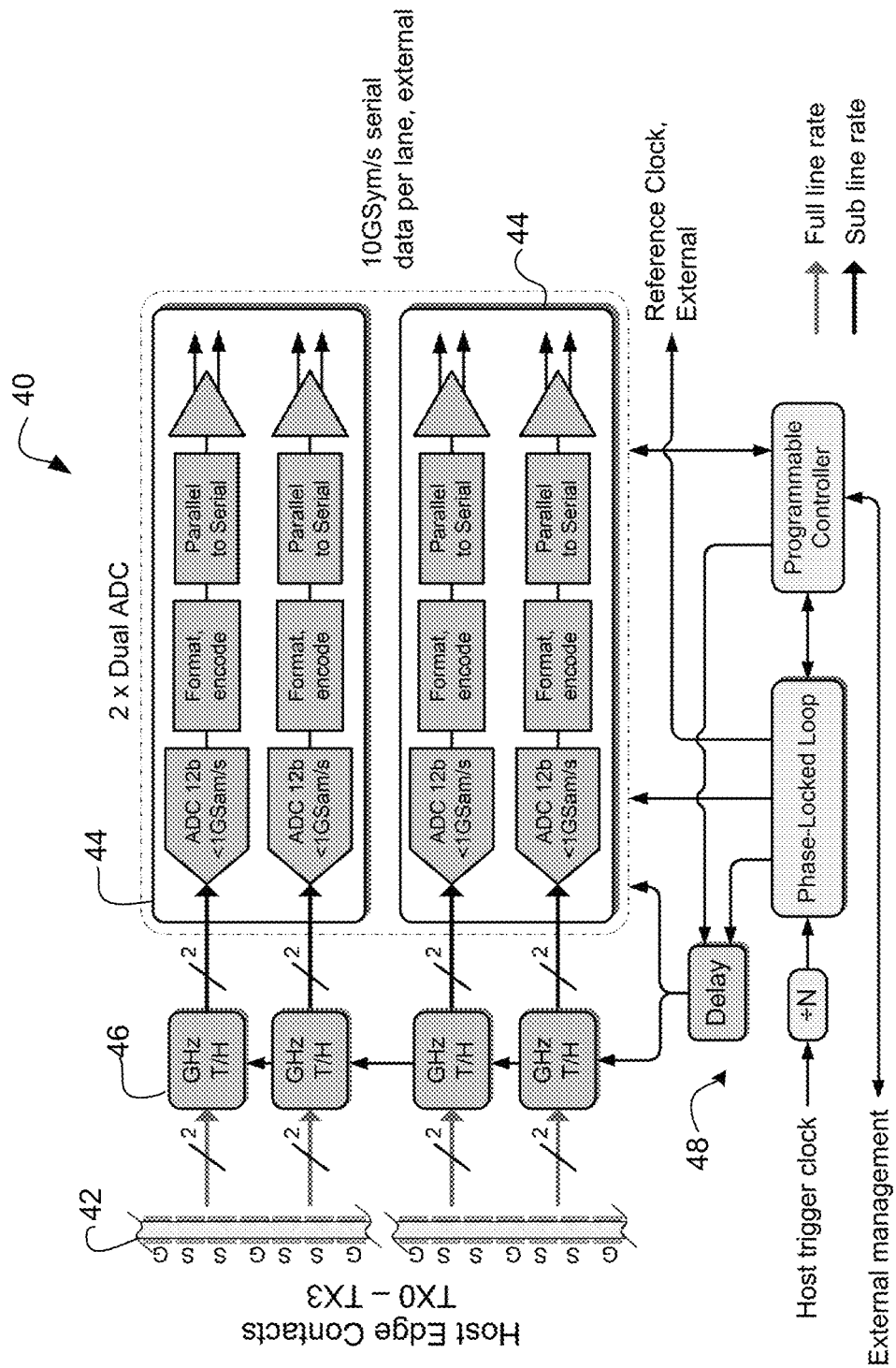
FIG. 4 is a block diagram illustrating electronic details of the test module, in accordance with one embodiment.

FIG. 4 illustrates an example implementation of a test module, generally indicated at 40, using a coherent signal sourced by a host comprising four channels. In this example, a data capture card is utilized, as described above with respect to FIG. 2. It is to be understood that this is only an example and the test module may be used for other types of modulation formats, different data rates (e.g., higher or lower data rates), and a different number of channels.

In this example, each port of the host system under test delivers four lanes of serial data (e.g., at 32 Gsym/s (Gigasymbols per second)) and two samples per symbol. Data is received from the host at host edge contacts 42. The test module 40 is configured in this example to capture analog samples on all four transmitter lanes at once, convert the analog samples to digital data with precision that is higher than D/A convertor precision in the host, serialize and present the converted data to external hardware for post-processing in software (e.g., at server 26 in FIG. 2). Once it is delivered, binary data may be processed in software at the server 26 to remove artifacts of the D/A conversion process in the host and the A/D conversion process in the test module 40, and subsequently process the data to derive scattering parameters (e.g., S21 (insertion loss)) of the host system (FIGS. 2 and 4).

As previously described, the test module 40 is configured to deliver sampled data at higher precision than is present in the host, and to do so relies on under sampling to capture and convert all four lanes of serial data. Successful undersampled conversion implies that the test module 40 maintains a known, stable reference timing point (host trigger clock) for the start sampled data, completes one full pass of captured samples in a repeated source waveform, then returns to the reference timing point plus one very small offset time step. As shown in FIG. 4, the timing may be synchronized through various clock components, generally indicated at 48, including sample timing delay and phase-locked loop. Each sampling pass is repeated on the host waveform up to a timing point where a next-step would necessarily overlap with a sample from the first pass, at which time the sampling process increments a very small sample timing delay. The sampling process is then repeated until the next overlap step point, where timing delay is incremented again. The process is repeated up to the end of an established timing increment count, and sampling ends. Each pass of sampled data may be delivered as a separate file of binary values that are the actual analog values captured from the host waveform. In order to post-process, software may first re-interleave binary file data from each sample pass, one at a time, starting from the last sample pass and moving to the first, for example. The software may then remove predictable conversion artifacts imparted to the host pattern (e.g., "Sinc" or Sin(x)/x, possibly sample noise), remove residual bandwidth-limit effects from A/C conversion, and derive host scattering parameters (e.g., S21). Comparison of extracted S21 data with pre-established S21 reference data may then be used to qualify host electrical behavior and identify any anomalies or defects in the host based on specified (e.g., predefined) limits.

Present-day high-resolution, high bandwidth A/D convertors have input bandwidth limit that is inherently lower than the bandwidth of a signal to be sampled. In one embodiment, the test module 40 mitigates its inherent bandwidth limit by preceding A/D conversion (e.g., at 2× dual ADC (analog-to-digital converter) 44) with much higher bandwidth Track & Hold (T/H) circuits 46. The T/H circuit 46 is used to track a varying input signal and periodically provide a held value on an output terminal. The held value on the output terminal is updated over time to implement the sampling function. Present-day Track & Hold circuits can impose their own bandwidth limit on a signal to be sampled, and that impairment is mitigated through post-processing of captured binary signal values.

A common microcontroller may be used to manage on-chip operation and initialization. Critical timing control between ADCs 44 and T/Hs 46 may be managed through the use of programmable delay lines and programmable high-frequency binary counters. Programmable delay lines allow for management of skew between host signal lanes and between convertors, and programmable binary counters allow for direct management of both the length (duration) of each sample pattern pass, and the finite time steps between full pattern sample passes. In one example, global timing reference may be controlled by a Phase-Locked Loop (PLL) circuit with multiple, independently programmable reference frequency ports and built-in management for back-end serial data coding format that is used by the ADCs 44.

It is to be understood that the electrical diagram of test module 40 shown in FIG. 4 and operation described above is only an example and that other electrical components, circuits, arrangement of components or circuits, sampling rate, or number of channels may be used without departing from the scope of the embodiments.

Figure 5:
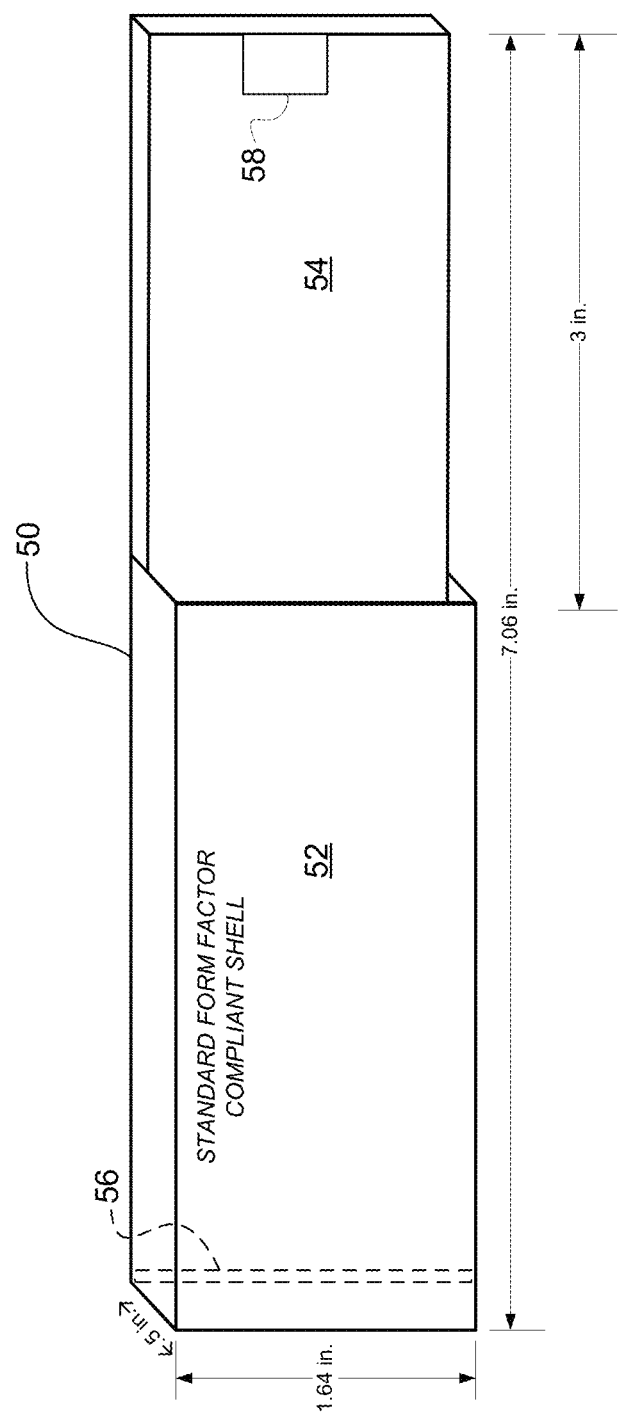
FIG. 5 is a perspective diagram illustrating an example of a form factor of the test module, in accordance with one embodiment.

As previously described with respect to FIG. 1B, the test module 10 is a module form factor that connects directly to the host 12 and complies at least in part with an exterior form factor in accordance with one or more pluggable module standards. The test module 10 is also configured to conform to mechanical and electrical constraints of the host signaling system, while not presenting excessive power load on the host system under test. FIG. 5 schematically illustrates an example of a test module form factor, in accordance with one embodiment. It is to be understood that the general size, shape, and dimensions shown are only provided as an example and the test module may conform to different standards and have different dimensions without departing from the scope of the embodiments.

The test module 50 includes an electrical connector (module plug connector assembly) 56 that is contained as a sub-component within the test module and is configured to connect to the host interface. As shown in the example of FIG. 5, a first portion 52 of the test module 50 conforms to a CFP2 (e.g., CFP2-ACO) standard form factor. The first portion 52 of the test module may be configured to fit within any standard module form factor, including for example XFP, SFP, SFP+, CSFP, QSFP+, CFP2, CFP4, or any other current or future pluggable module form factor standard.

Figure 6:
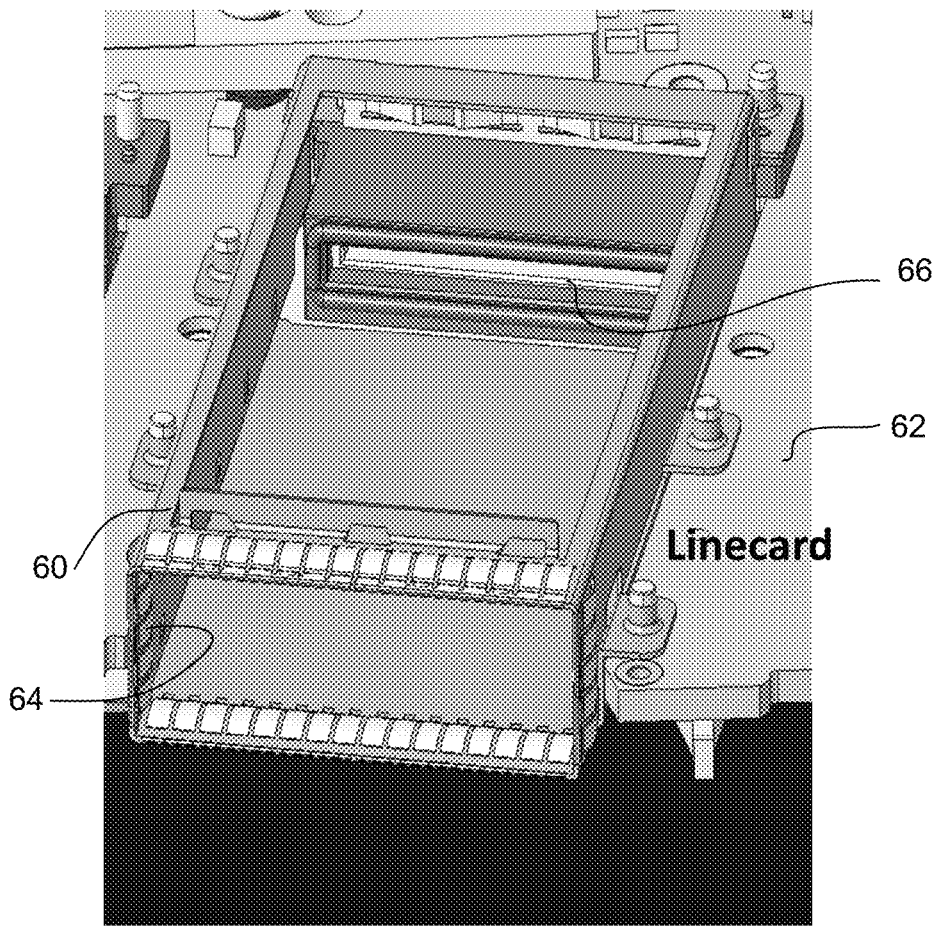
FIG. 6 illustrates a host interface element for direct connection of the test module to the host, in accordance with one embodiment.

Portion 52 of the test module 50 is configured to fit into a host cage system 60 mounted on a line card 62, as shown in FIG. 6. The host cage system 60 may include, for example, a connector cover and connector reflow mount fabricated with the host, and configured for receiving one or more transceiver modules (e.g., CFP2 module). At least a first portion 52 of the test module 50 is configured for insertion into the cage 60 mounted on the line card 62. The cage assembly 60 includes an opening 64 for receiving the test module 50 and a connector (host interface) 66.

Referring again to FIG. 5, a second portion 54 of the test module 50 extends from the standard compliant shell portion 52 of the test module and may include one or more interfaces or connectors 58 for use in transmitting data to the data capture card 24 (FIG. 2) or server 36 (FIG. 3). In one example, the second portion 54 may comprise a circuit board extending from the first portion 52 of the test module 50 and comprise one or more electrical components or circuits configured for use in sampling data and analyzing modulation of the host.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A test module comprising:
a connector for directly connecting the test module to a host when the test module is inserted into an opening in the host configured for receiving a pluggable transceiver;
a sampler module configured for under-sampling a periodic waveform transmitted from the host, wherein said under-sampling comprises sampling a high frequency process and re-constructing captured samples for post-processing; and
an interface for transmitting sampled data to a processing device operable to process and analyze the sampled data for use in determining if the host is operating within specified limits;
wherein the host transmits a signal directly to the test module at the connector when the test module is inserted into said opening in the host and wherein the test module operates as a modulation analyzer for the host.

2. The test module of claim 1 wherein the test module is configured for analyzing different rates with different types of modulation including coherent signals.

3. The test module of claim 1 wherein the processing device is configured to extract electrical scattering parameters.

4. The test module of claim 1 wherein the test module comprises a first portion corresponding to a standard pluggable transceiver form factor and inserted into said opening in the host.

5. The test module of claim 1 wherein the test module is further operable to perform data capture and receive input controlling said under-sampling.

6. The test module of claim 1 wherein the interface is configured to transmit the sampled data to a data capture card interposed between the test module and the processing device.

7. The test module of claim 1 wherein the test module is operable to simultaneously sample data on a plurality of channels at the host.

8. The test module of claim 1 further comprising a track and hold circuit and at least one channel configured for uniform distribution of a transmitter waveform.

9. The test module of claim 1 wherein the periodic waveform comprises a high-bandwidth, high-frequency analog waveform.

10. The test module of claim 1 wherein the sampler module is operable to sample at a rate that is time-synchronous with a source waveform at the host.

11. The test module of claim 1 wherein the sampler module is operable to transmit results of the sampled data in a computer-compatible binary format for processing in software at the processing device.

12. A system comprising:
a test module comprising:
a connector for directly connecting the test module to a host when the test module is received at a host interface configured for receiving a pluggable transceiver;
a sampler module configured for under-sampling a periodic waveform transmitted from the host, wherein said under-sampling comprises sampling a high frequency process and re-constructing captured samples for post-processing; and
an interface for transmitting sampled data to a processing device; and
the processing device operable to reconstruct the periodic waveform from the sampled data and process and analyze the sampled data for use in determining electrical behavior of the host;
wherein the host transmits a signal directly to the test module at the connector when the test module is inserted into said opening in the host and wherein the test module operates as a modulation analyzer for the host.

13. The system of claim 12 wherein the test module is configured for analyzing different rates with different types of modulation including coherent signals.

14. The system of claim 12 wherein the processing device is configured to extract electrical scattering parameters.

15. The system of claim 12 wherein the test module comprises a first portion corresponding to a standard pluggable transceiver form factor for insertion directly into the host.

16. The system of claim 12 wherein the test module is further operable to perform data capture and receive input controlling said under-sampling.

17. The system of claim 12 further comprising a data capture card interposed between the test module and the processing device.

18. The system of claim 12 wherein the test module is operable to simultaneously sample data on a plurality of channels at the host and wherein the test module is configured for uniform distribution of the periodic waveform for each of said plurality of channels.

19. The system of claim 12 wherein host comprises a linecard for operation in a network device.

20. A method comprising:
receiving a signal transmitted from a host at a test module, at least a portion of the test module inserted directly into a host interface configured to receive a pluggable transceiver module;
under-sampling the signal, wherein said under-sampling comprises sampling a high frequency process and reconstructing captured samples for post-processing;
reconstructing the signal; and
processing the reconstructed signal for extraction of electrical parameter data for analyzing performance of the host;
wherein the host transmits a signal directly to the test module when the test module is inserted into the host and wherein the test module operates as a modulation analyzer for the host.

* * * * *